(12) United States Patent
Taji et al.

(10) Patent No.: US 7,874,395 B2
(45) Date of Patent: Jan. 25, 2011

(54) ELECTRIC MOTOR MOUNTING STRUCTURE FOR VEHICLES

(75) Inventors: Toshiya Taji, Anjo (JP); Atsushi Takeda, Oakazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 583 days.

(21) Appl. No.: 11/898,071

(22) Filed: Sep. 7, 2007

(65) Prior Publication Data

US 2008/0078603 A1  Apr. 3, 2008

(30) Foreign Application Priority Data

Sep. 28, 2006 (JP) ............................. 2006-264965
Sep. 28, 2006 (JP) ............................. 2006-264997

(51) Int. Cl.
*B60K 1/00* (2006.01)
(52) U.S. Cl. .................... 180/300; 180/295; 180/299
(58) Field of Classification Search .............. 180/65.1, 180/291, 292, 293, 295, 297, 299, 300
See application file for complete search history.

(56) References Cited

U.S. PATENT DOCUMENTS

| 4,593,786 | A  | * | 6/1986  | Tate ........................ 180/291 |
| 5,145,020 | A  | * | 9/1992  | Quintile et al. ........... 180/65.1 |
| 6,176,335 | B1 | * | 1/2001  | Schaffner et al. ......... 180/65.1 |
| 7,562,737 | B2 | * | 7/2009  | Miyahara et al. .......... 180/291 |
| 7,614,473 | B2 | * | 11/2009 | Ono et al. ................. 180/299 |
| 2002/0096384 | A1 | * | 7/2002  | Yoshida et al. ............ 180/298 |
| 2002/0100622 | A1 | * | 8/2002  | Shimizu et al. ............ 180/65.1 |
| 2002/0170763 | A1 | * | 11/2002 | Townsend ................. 180/220 |
| 2002/0189873 | A1 | * | 12/2002 | Mizuno ..................... 180/65.3 |
| 2004/0046450 | A1 | * | 3/2004  | Yoshida et al. ............ 307/10.1 |
| 2004/0060750 | A1 | * | 4/2004  | Chernoff et al. .......... 180/65.1 |
| 2007/0051549 | A1 | * | 3/2007  | Fukuda ..................... 180/232 |
| 2008/0060867 | A1 | * | 3/2008  | Oda et al. ................. 180/291 |

FOREIGN PATENT DOCUMENTS

| JP | 02175330   | A | * | 7/1990 |
| JP | 8-310252   | A |   | 11/1996 |
| JP | 8-310253   | A |   | 11/1996 |
| JP | 2000-062471 | A |   | 2/2000 |
| JP | 2003-2229  | A |   | 1/2003 |
| JP | 2004-299598 | A |   | 10/2004 |
| JP | 2005-271779 | A |   | 10/2005 |
| JP | 2005-319979 | A |   | 11/2005 |

* cited by examiner

*Primary Examiner*—J. Allen Shriver, II
*Assistant Examiner*—John R Olszewski
(74) *Attorney, Agent, or Firm*—Birch, Stewart, Kolasch & Birch, LLP

(57) ABSTRACT

A structure for mounting an electric motor in a vehicle, comprises: a mounting frame detachably fixed to a body component of the vehicle by a bolt; an upward-projecting bracket, which is upwardly projected from the mounting frame, being attached to the body component of the vehicle; a bolt hole, in which the bolt is inserted, being formed on the upward-projecting bracket; and a downward-projecting bracket, which is downwardly projected from the mounting frame, being connected to the electric motor. Both the mounting frame and the downward-projecting bracket are set apart from an axis of the bolt hole.

10 Claims, 6 Drawing Sheets

ELECTRIC MOTOR MOUNTING STRUCTURE FOR VEHICLES

BACKGROUND OF THE INVENTION (1) Field of the Invention

The present invention relates to a structure for mounting an electric motor in vehicles such as Electric Vehicles and Hybrid Vehicles.

(2) Description of Related Art

In recent years, techniques related to Electric Vehicles and Hybrid Vehicles have been developed to protect the global environment.

For example, the following related document 1 discloses a structure for mounting an electric motor in a vehicle.

The technique of the related document 1 will now be described briefly. In this part of the description, numerals in brackets correspond to numerals used in figures of the related document 1.

In the related document 1, as shown in FIG. 1 and FIG. 2, a parts-mounting frame (8) is disclosed which is comprised of two lateral frames (9) and a longitudinal frame (10) connecting the frames (9).

The related document 1 also discloses that a motor unit (15) is fixed on the bottom of the parts-mounting frame (8) by bolts (19 and 19). Further the document discloses that a control unit (11) is fixed on the upper side of the parts-mounting frame (8).

Furthermore, the document 1 discloses that the parts-mounting frame (8) is fixed to side members (5 and 5) via brackets (29 and 30).

Moreover, the document 1 discloses that, during assembly, a center member (23) is fixed to a first cross member (6) after the parts-mounting frame (8) is fixed to the side members (5). Further, it is also disclosed that the bolts (19) are removed after the side motor mount (22) is connected to a frame-side-mounting bracket (27)

[Related Document 1] H08 (1996)-310252 Japanese Laid-open Publication

However, by the technique of the related document 1, it is difficult to fully utilize the space above the parts-mounting frame (8) because the parts-mounting frame (8) is fixed to the side members (5) at the substantially same level as the side members (5).

Further, for the same reason, the center of gravity of the motor unit (15) is relatively high, thus, the movability is worsened.

To fix frame-side-brackets (29) to the side members (5), a worker stands under the frame-side-brackets (29) to handle bolts/nuts (32), and then the worker has to move above body-side-brackets (30) to handle other bolts/nuts (33). Accordingly, fixing the parts-mounting frame (8) to the side member (5) is awkward using the technique of the related document 1.

On the other hand, although it must be effective for absorbing vibration and noise from the motor unit (15) to equip bushes at mountings (21 and 22), it is difficult to prevent the motor unit (15) from rolling due to driving of the motor unit (15). Fundamentally, the related document 1 is totally silent about the importance of suppression of the motor unit (15) roll.

Namely, by the technique of related document 1, mountings (21 and 22) support the motor unit (15) against the force input from the motor unit (15) due to the roll, and accordingly, it is difficult to avoid increasing the size and durability of the mountings (21 and 21). Consequently, it is difficult to downsize and cost-cut by the technique of related document 1.

Further, during acceleration of the vehicle, roll is enhanced due to inertia of the motor unit (15).

SUMMARY OF THE INVENTION

The present invention has been developed in consideration of this situation, and it is therefore a first object of the invention to provide a structure for mounting an electric motor in a vehicle to improve drivability of the vehicle while utilizing spaces in the vehicle, and further, to improve ease of mounting the electric motor on a body component of the vehicle.

For this purpose, in accordance with an aspect of the present invention, there is provided a structure for mounting an electric motor to a vehicle comprising a mounting frame detachably fixed to a body component of the vehicle by a bolt; a upward-projecting bracket, which is upwardly projected from the mounting frame, being attached to the body component of the vehicle; a bolt hole, in which the bolt is inserted, being formed on the upward-projecting bracket; and a downward-projecting bracket, which is downwardly projected from the mounting frame, being connected the electric motor, both the mounting frame and the downward-projecting bracket being set apart from an axis of the bolt hole.

Further, it is therefore a second object of the invention to provide a structure for mounting an electric motor in a vehicle to suppress the strength of roll of the electric motor during acceleration of the vehicle.

For this purpose, in accordance with another aspect of the present invention, there is provided a structure for mounting an electric motor in a vehicle comprising means for fixing the electric motor to the vehicle; and means for defining position of a motor-roll-center which is theoretical point of roll when the electric motor works, wherein the motor-roll-center defining means sets the location of the motor-roll-center above a mass center of the electric motor.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF THE PREFERRED EMBODIMENTS

The embodiment of the present invention will now be described with reference to the accompanying drawings.

Figure 1:
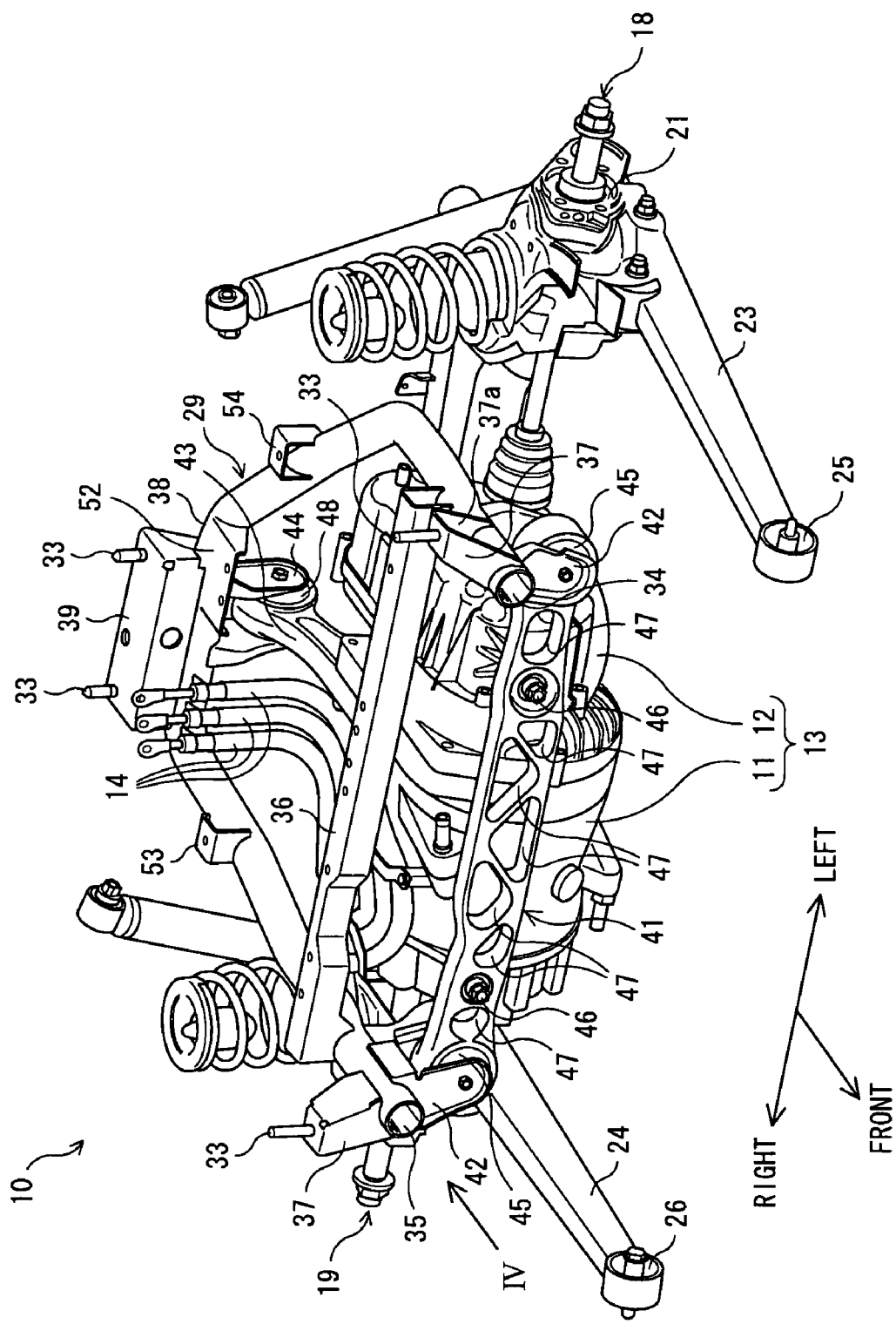
FIG. 1 is a perspective view of an embodiment of the present invention schematically showing main components of a structure for mounting an electric motor in a vehicle.
Figure 2:
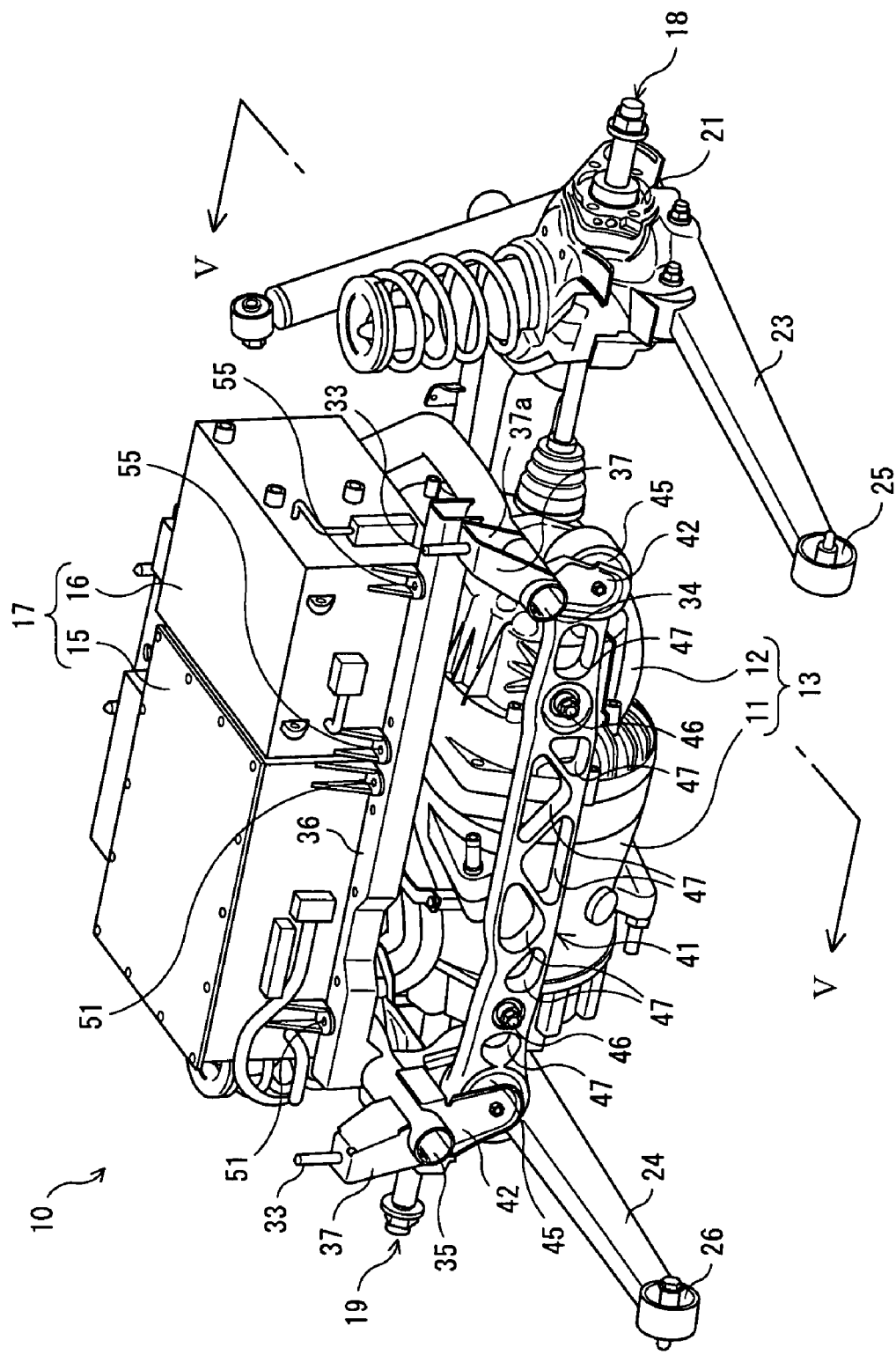
FIG. 2 is a perspective view of the embodiment of the present invention schematically showing main components of the electric motor mounting structure including a control unit.

As shown in FIG. 1 and FIG. 2, a motor unit 13, which includes an electric motor 11 and a reduction gear box 12, is installed at a rear side of a vehicle 10.

The electric motor 11, which is connected with a control unit 17 shown in FIG. 2 by the electric cables 14, drives rear wheels (not shown). The electric motor 11 is disposed in such a manner that a rotation axis (not shown) of the motor 11 extends in a width direction of the vehicle 10 (see arrows Left and Right in FIG. 1). Namely, the motor unit 13 is mounted on the vehicle 10 in a transverse layout manner.

The reduction gear box 12, which is mechanically connected with the electric motor 11 and is also connected with a left-drive-shaft assembly 18 and a right-drive-shaft assembly 19, individually transmits the rotation input from the electric motor 11 to the left-drive-shaft assembly 18 and the right-drive-shaft assembly 19 after reducing the speed of input rotation. The reduction gear box 12 includes a differential gear mechanism (not shown) permitting the left-drive-shaft assembly 18 to rotate at a different speed from the right-drive-shaft assembly 19.

A left wheel (not shown) is fixed at a left end of the left-drive-shaft assembly 18, and a left bearing 21 rotatably supports a portion near the left end of the left-drive-shaft assembly 18. The left bearing 21 is supported by a rear end of a left trailing arm 23.

Likewise, a right wheel (not shown) is fixed at a right end of the right-drive-shaft assembly 19, and a right bearing (not shown) rotatably supports a portion near the right end of the right-drive-shaft assembly 19. The right bearing is supported by a rear end of a right trailing arm 24.

Figure 3:
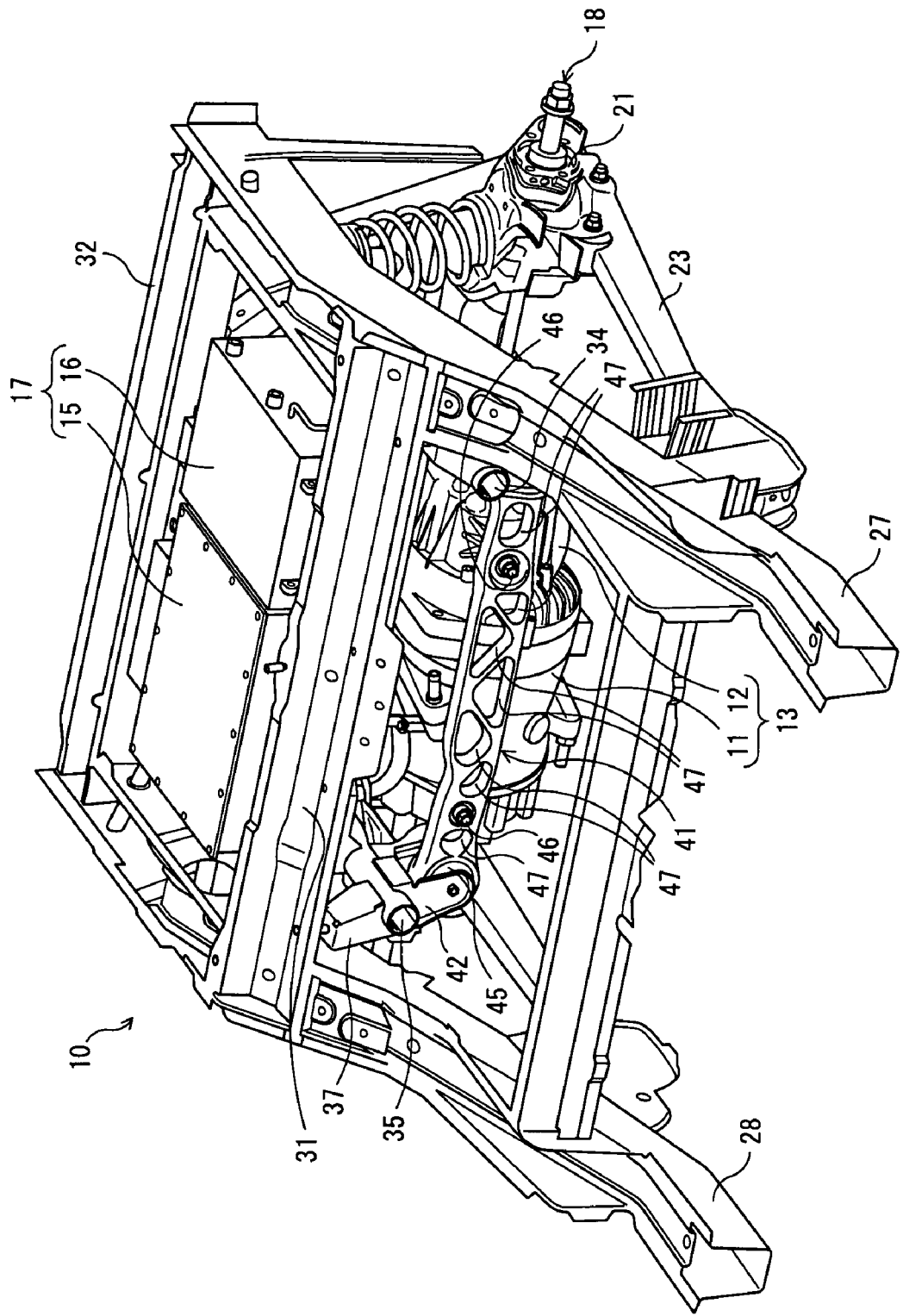
FIG. 3 is a perspective view of the embodiment of the present invention schematically showing main components of the electric motor mounting structure including the control unit and a body component of the vehicle.

A rubber bush 25, which is equipped in a top end of the left trailing arm 23, is movably connected with a side member (body component) 27 shown in FIG. 3.

Likewise, another rubber bush 26, which is equipped in a top end of the right trailing arm 24, movably connected with another side member (body component) 28 shown in FIG. 3.

As shown in FIG. 1, the motor unit 13 is fixed to the bottom of the motor-mounting frame (mounting frame) 29.

The motor-mounting frame 29 is made by bending a metal pipe into a substantially U shape. As shown in FIG. 3, the motor-mounting frame 29 is detachably fixed to a rear-floor cross-member (body component) 31 and a lateral-rod-supporting cross-member (body component) 32 by bolts 33 (shown in FIG. 1).

The rear-floor cross-member 31, which is a metal member extending in a width direction of the vehicle 10 and which connects each of side members 27 and 28 extended in a longitudinal direction of the vehicle 10, supports the front edge of a load floor (not shown).

The lateral-rod-supporting cross-member 32, which is also a metal member extending in a width direction of the vehicle 10 and which connects each of side members 27 and 28, supports the rear edge of a load floor (not shown).

On the motor mounting frame 29, amounting-cross member (cross member) 36 is installed. The mounting-cross member 36, which is a member extending in a width direction of the vehicle 10, connects a point adjacent to a left-front end 34 and another point adjacent to a right-front end 35 of the motor-mounting frame 29.

On the motor mounting frame 29, between the left-front end 34 and the mounting-cross member 36, an upward-projecting-A bracket (upward-projecting bracket) 37 is provided. Further, on the motor mounting frame 29, between the right-front end 35 and the mounting-cross member 36, another upward-projecting-A bracket 37 is also provided. Each of the upward-projecting-A brackets 37, which is a part projecting upwardly from the motor mounting frame 29, attaches to the bottom of the rear-floor cross-member 31 (shown in FIG. 3).

The upward-projecting-A bracket 37 is a hollow square pillar in shape, the bottom of which is welded onto the motor mounting frame 29.

Figure 4:
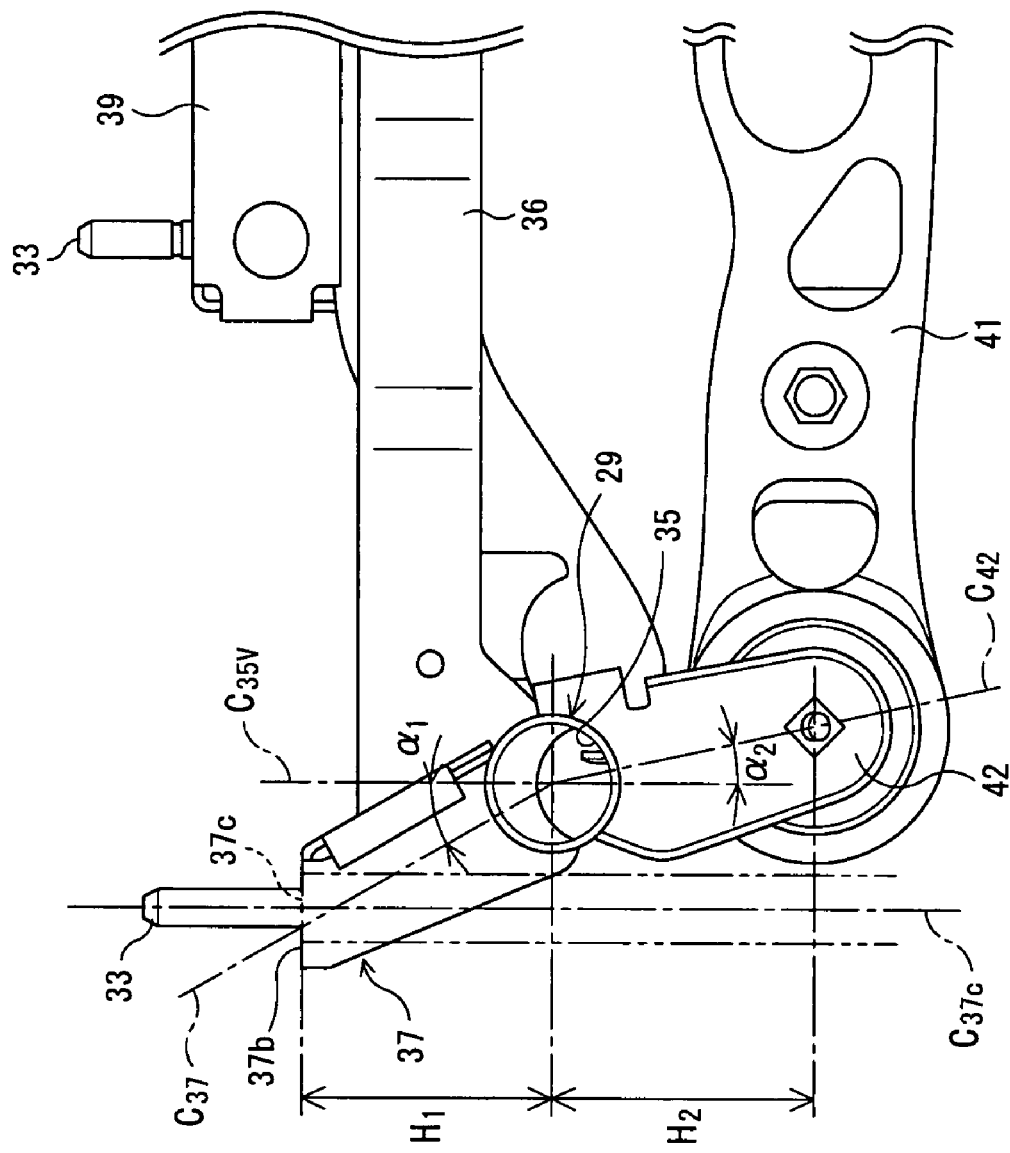
FIG. 4 is a front view of the embodiment of the present invention schematically showing a portion indicated by an arrow IV in FIG. 1.

A side surface of the upward-projecting-A bracket 37 is excluded to make an opening 37a. As shown in FIG. 4, on an upper surface 37b of the upward-projecting-A bracket 37, a bolt hole 37c is formed in which the bolt 33 is inserted.

Further, an upward-projecting-B bracket 39, which is a part projected upwardly from the motor-mounting frame 29, attaches to the bottom of the lateral-rod-supporting cross-member 32.

The upward-projecting-B bracket 39 is also a hollow square pillar in shape, the bottom of which is welded on the motor mounting frame 29. A back surface of the upward-projecting-B bracket 39 is excluded to make an opening (not shown).

At the bottom of the motor-mounting frame 29, a pair of downward-projecting-A brackets (downward-projecting bracket, motor fixing means, motor-roll-center defining means) 42 and 42, which support the motor unit 13 via a front-mounting bracket 41 (described later), are individually projected downwardly from a point adjacent to the left-front end 34 of the motor-mounting frame 29 and another point adjacent to the right-front end 35 of the motor-mounting 29. In the side view shown in FIG. 5, the pair of downward-projecting-A brackets 42 and 42 are individually disposed just under each of the upward-projecting-A brackets 37 and 37.

Each the downward-projecting-A bracket 42, which is made from metal plate and which includes a lower opening, is formed in a substantially U-shape so that the front-mounting bracket 41 can be inset to the downward-projecting-A bracket 42 through the lower opening from a left, right or lower side.

Further, at the bottom of the motor-mounting frame 29, a downward-projecting-B bracket (motor fixing means, motor-roll-center defining means) 44, which supports the motor unit 13 via a rear-mounting bracket 43 (described later), is projected downwardly from a point adjacent to the rear end 38 of the motor-mounting frame 29. The downward-projecting-B bracket 44, which is also made from metal plate and is a part including a lower opening, is formed in a substantially U shape so that the rear-mounting bracket 43 can be inset to the downward-projecting-B bracket 44 through the lower opening from a front, rear or lower side.

The upward-projecting-A bracket 37 and the downward-projecting-B bracket 42 will now be described in a little more detail with reference to FIG. 4.

As shown in FIG. 4, in the front view, an axis line $C_{37}$ of the upward-projecting-A bracket 37 inclines at an angle of $\alpha_1$ from a vertical axis $C_{35V}$ on the right-front end 35 of the motor mounting frame 29.

An axis $C_{42}$ of the downward-projecting-A bracket 42 inclines $\alpha_2$ in angle from the vertical axis $C_{35V}$ on the right-front end 35 of the motor mounting frame 29.

Any of the motor mounting frame 29, the downward-projecting-A bracket 42 and the front-mounting bracket (motor bracket) 41 is set apart (off set) from an axis $C_{37C}$ of the bolt hole 37c to the center side of the vehicle 10 (right direction in FIG. 4). According to this arrangement, as shown by a two-dot chain line in FIG. 4, it is possible to make a path for inserting the bolt 33 put in the bolt hole 37c and for inserting tools to turn the bolt 33.

The off set distance is defined to be as short as possible while securing a distance necessary to insert the bolt 33 and the tools used for the bolt 33. Thus, even if the motor unit 13 vibrates in the vertical direction, it is possible to decrease the degree of bending momentum input to the point connected to the upward-projecting-A bracket 37 and the rear-floor cross-member 31.

As shown in FIG. 1, the front-mounting bracket 41, which is a bracket extending in the transverse direction having rubber bushes (vibration dampener; motor fixing means and motor-roll-center defining means) 45 and 45 at both ends, is fixed on the front side of the motor unit 13 by bolts 46 and 46. The pair of rubber bushes 45 and 45 of the front-mounting bracket 41 are individually fixed to the downward-projecting-A brackets 42 and 42.

The front-mounting bracket 41 is made of cast aluminum. The front-mounting bracket 41 has seven holes 47.

The rear-mounting bracket 43 is a bracket extending in the longitudinal direction of the vehicle 10 having another rubber bush (vibration dampener; motor fixing means, motor-roll-center defining means) 48 at its rear end. A front end of the rear-mounting bracket 43 is fixed to the motor unit 13. The rear rubber bush 48 is fixed to the downward-projecting-B bracket 44.

Consequently, it is possible to absorb the noise and vibration generated from the motor unit 13 with the rubber bushes 45 and 45 equipped at the front-mounting bracket 41 and the rear rubber bush 48 equipped at the rear-mounting bracket 43. Further, it is also possible to fix the motor unit 13 to the rear-floor cross-member 31 and the lateral-rod-supporting cross-member 32 of the vehicle 10.

As shown in FIG. 2, the control unit 17 is mounted on the motor-mounting frame 29.

The control unit 17 mainly includes an inverter unit 15 and a DC-DC converter unit 16 in which a charging unit (not shown) is provided.

The inverter unit 15 controls the electricity supplied to the motor unit 13.

The DC-DC converter unit 16, which is connected to a high-voltage battery (not shown) rated at 300V and has 300V-electricity input from the high-voltage battery, converts the potential difference of the electricity from 300V into 12V and supplies the 12V-electricity to a low-voltage circuit (not shown).

Two flanges 51 and 51 are provided at the front end of the inverter unit 15. The flanges 51 and 51 disposed on the mounting-cross member 36 are fastened by bolts (not shown) to the mounting-cross member 36.

Another flange (not shown) provided at the rear end of the inverter unit 15 is disposed on a rear flange 52 provided near the rear end 38 of the motor-mounting frame 29. The flange of the inverter unit 15 is fastened by bolts (not shown) to the rear flange 52.

Further, a right bracket 53 is provided on the motor-mounting frame 29 between the mounting-cross member and the rear end 38. The flange (not shown) of the inverter unit 15 is disposed on and fixed to the right bracket 53.

At the front end of the DC-DC converter unit 16, two flanges 55 and 55 are also provided. The flanges 55 and 55 are disposed on the mounting-cross member 36 and are fixed to the mounting-cross member 36 by bolts (not shown).

Further, at the rear end of the DC-DC converter unit 16, a flange (not shown) is provided. The flange is disposed on the rear flange 52 provided near the rear end 38 of the motor-mounting frame 29 and is fastened by bolts (not shown) to the rear flange 52.

On the motor-mounting frame 29, between the mounting-cross member 36 and the rear end 38, a left bracket 54 is provided. On the left bracket 54, a flange (not shown) is provided on the DC-DC converter unit 16 and is fixed to the left bracket 54 by bolts (not shown).

Figure 5:
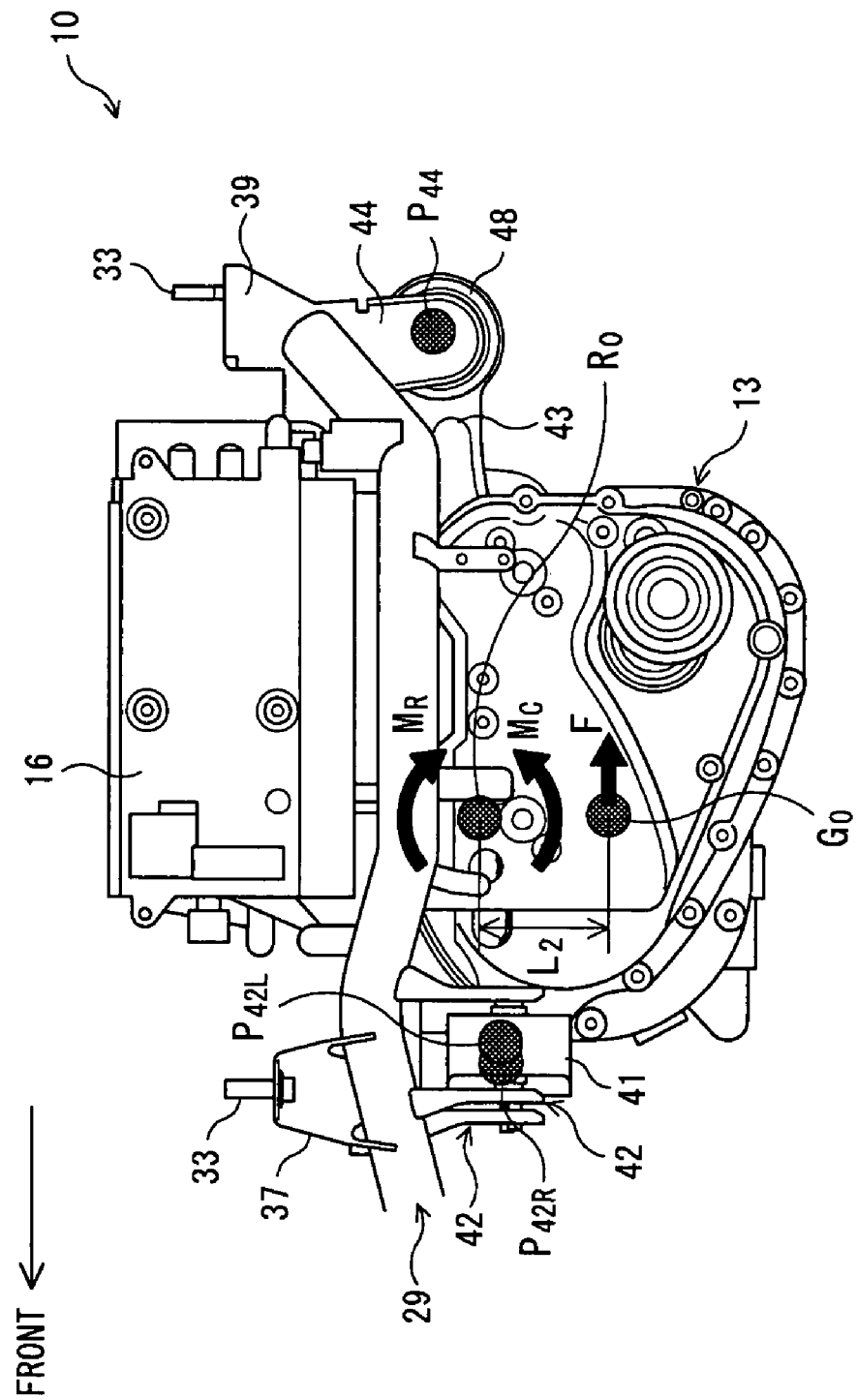
FIG. 5 is a side view of the embodiment of the present invention schematically showing a section along the line indicated by V-V in FIG. 2.

As shown in FIG. 5, the location of a motor-roll center $R_0$, which is an axis of roll-momentum $M_R$ of the motor unit 13 due to operation of the electric motor unit 11, is defined by adjustment of the location of the downward-projecting-A brackets 42 and 42 and the downward-projecting-B bracket 44 equipped with the motor-mounting frame 29 and/or by adjustment of the location and the characteristics of the rubber bushes 45 and 45 equipped with the front-mounting bracket 41 and the rubber bush 48 equipped with the rear-mounting bracket 43.

In other words, the downward-projecting-A brackets 42 and 42, the downward-projecting-B bracket 44, the rubber bushes 45 and 45 and the rubber bush 48, as a motor-roll-center defining means, define the motor-roll center $R_0$, which is the axis of roll-momentum $M_R$ of the motor unit 13. At the same time, the downward-projecting-A brackets 42 and 42, the downward-projecting-B bracket 44, the rubber bushes 45 and 45 and the rubber bush 48, as a motor fixing means, mount the motor unit 13 onto the vehicle 10. The motor-roll center $R_0$ is also called an elastic center.

In this embodiment, the location of the motor-roll center $R_0$ is set above the center of gravity $G_0$ of the motor unit 13. Specifically, the motor-roll center $R_0$ is substantially located directly over the mass center $G_0$.

At the motor-mounting frame 29, the downward-projecting-A brackets 42 and 42 and the rear-mounting bracket 44 fasten the motor unit 13 to the rear-floor cross-member 31 and the lateral-rod-supporting cross-member 32 via the motor-mounting frame 29 in such a manner that a rotation axis (not shown) of the motor 11 is extended in the transverse direction of the vehicle 10 (i.e. so that the motor 11 is mounted onto the vehicle 10 by the transverse layout manner).

The operation and effect of the present invention of this embodiment will now be described as follows.

As shown in FIG. 1, the motor unit 13 is fixed under the motor-mounting frame 29, as shown in FIG. 2, the control 17 is fixed on the motor-mounting frame 29. Then the motor-mounting frame 29 is mounted onto the vehicle 10. Accordingly, it is possible to mount the motor unit 13 and the control unit 17 onto the vehicle 10 at the same time, therefore, it is possible to reduce labor and costs for mounting the motor unit 13 and the control unit 17.

When the motor-mounting frame 29 is mounted onto the vehicle 10, the upward-projecting-A brackets 37 and 37 project upwards and contacts the under surface of the rear-floor cross-member 31, and the upward-projecting-B bracket 39 projects upwards and contacts the under surface of the lateral-rod-supporting cross-member 32. In this state, the motor-mounting frame 29 is fixed to the rear-floor cross-member 31 and the lateral-rod-supporting cross-member 32 by 4 bolts 39.

With this arrangement, as shown by an arrow $H_1$ in FIG. 4, it is possible to maximize the use of limited space in the vehicle 10 by keeping space for storage above the motor-mounting frame 29. Further, it is possible to improve drivability of the vehicle 10 due to lowering downward the center of gravity of the vehicle 10 ascribable to mounting the motor unit 13 to the vehicle 10 at the lower position.

Namely, because of mounting the motor unit 13 by the downward-projecting-A bracket 42 and 42 and the downward-projecting-B bracket 44 projected upwardly from the motor-mounting frame 29, as shown in an arrow $H_2$ in FIG. 4, it is possible to lower the mass center $G_0$ of the motor unit 13.

Further, all of the motor-mounting frame 29, the downward-projecting-A bracket 42 and front-mounting bracket 41 are set apart from the axis $C_{37C}$ of the bolt hole 37c to the center side of the vehicle 10, and accordingly, as shown by the two-dot chain line in FIG. 4, it is possible to make a path for inserting the bolt 33 in the bolt hole 37c and also to insert tools for turning the bolt 33. Furthermore, when the bolt 33 is inserted into the bolt hole 37c, the motor-mounting frame 29 and the downward-projecting-A bracket 42 are not collide against the bolt 33 and the tools, and therefore, the workability of mounting the motor-mounting frame 29 in the vehicle 10 is improved.

Moreover, the mounting-cross member 36 connects between the point adjacent to the left-front end 34 and the opposite point adjacent to the right-front end 35 of the motor-mounting frame 29, and consequently, the stiffness of the motor-mounting frame 29 is increased.

The stiffness-enhanced motor-mounting frame 29 avoids distortion and/or bending of the motor-mounting frame 29, and therefore, it is possible to improve the degree of precision for mounting the motor-mounting frame 29 in the vehicle 10.

Further, it is possible to maximize the use of spaces above the motor-mounting frame 29 by disposing the control unit 17 on the mounting-cross member 36.

Furthermore, by disposing the control unit 17 and the motor unit 13 close together, it is possible to reduce electrical loss and costs for the electric cables 14 connecting the control unit 17 and the motor unit 13, because the length of the electric cables 14 can be shortened.

Also, it is possible to reduce costs and labor for producing the motor-mounting frame 29 by bending a metal pipe into a substantially U shape.

Additionally, it is possible not to excessively decrease the space available for disposed of the control unit 17 above the motor-mounting frame 29, because the pair of upward-projecting-A brackets 37 and the pair of downward-projecting-A brackets 42 are individually fixed at the left-front end 34 and right-front end 35 of the motor-mounting frame 29. Further, it is possible not to excessively decrease the space under the motor-mounting frame 29 available for disposed of the motor unit 13.

In the side view as shown in FIG. 5, each the downward-projecting-A bracket 42 is disposed just under each the upward-projecting-A bracket 37. Accordingly, it is possible to reduce the distance between two working positions, at one of which a worker connects the motor unit 13 and the downward-projecting A-bracket 42, and the others at which the same worker connects the motor mounting frame 29 and the rear-floor cross-member 31, and between the motor-mounting frame 29 and the lateral-rod-supporting cross-member 32.

In the front view as showing FIG. 4, each the downward-projecting-A bracket 42 is also disposed just under each the upward-projecting-A bracket 37. Additionally, any of the motor mounting frame 29, the downward-projecting-A bracket 42 and the front-mounting bracket (motor bracket) 41 is set apart (off set right side in FIG. 4) from the axis $C_{37C}$ of the bolt hole 37c to the center side of the vehicle 10.

The off set distance is defined to be as short as possible while securing a distance necessary for inserting the bolt 33 and the tools used for the bolt 33.

Thus, even if the motor unit 13 vibrates in a vertical direction, it is possible to decrease the degree of bending momentum input to the point connected to the upward-projecting-A bracket 37 and the rear-floor cross-member 31.

Further, each of the downward-projecting-A brackets 42 and 42 supports each of the rubber bushes 45 and 45 individually disposed at both ends of the front-mounting bracket 41. Likewise, the downward-projecting-B bracket 44 supports the rubber bush 48 disposed at the rear end of the rear-mounting bracket 43.

Accordingly, it is possible to prevent to come the vibration and/or noise generated by the motor unit 13 being felt or heard inside the vehicle 10 through the downward-projecting-A brackets 42 and 42, the downward-projecting-B brackets 43 and 43 and the motor-mounting frame 29.

Further, the motor-mounting frame 29 is detachably fixed to the rear-floor cross-member 31 and the lateral-rod-supporting cross-member 32 by bolts 33, and accordingly, it is possible to easily maintain easily the motor unit 13 and the control unit 17.

Additionally, the upward-projecting-A-bracket 37 is formed as a hollow square pillar in shape, thus, it is possible to reduce the weight while enough securing rigidity to support the motor-mounting frame 29.

Likewise, the upward-projecting-B bracket 39 is also formed as a hollow square pillar in shape, and accordingly, it is possible to improve the stiffness and decrease the weight.

Further, the front-mounting bracket 41 is made of aluminum to reduce the weight. Additionally, seven holes 47 are formed on the front-mounting bracket 41, and consequently, weight reduction and greater stiffness are realized.

Moreover, the rear flange 52, which is a flat plate in shape, is provided near the rear end 38 of the motor-mounting frame 29. Accordingly, even if the inverter unit 15 and the DC-DC converter unit 16 are not just on the target position, it is possible to avoid dropping off the inverter unit 15 and the DC-DC converter unit 16 from the rear flange 52.

Further, the downward-projecting-A brackets 42 and 42 and the downward-projecting-B bracket 44 sets the motor-roll center $R_0$ above the center of gravity $G_0$ of the motor-unit 13, and accordingly, during acceleration of the vehicle 10, it is possible to generate a counter momentum $M_C$ which is a momentum suppressing the roll-momentum $M_R$ of the motor unit 13.

Specifically, the downward-projecting-A brackets 42 and 42 and the downward-projecting-B bracket 44 sets the motor-roll center $R_0$ substantially just over the center of mass $G_0$ of the motor-unit 13, and consequently, it is possible to prevent generating the roll-momentum $M_R$ Of the motor unit 13 even if the motor unit 13 vibrates in a vertical direction.

Further, the downward-projecting-A brackets 42 and 42 and the rear-mounting bracket 44 mounts the motor unit 13 in the vehicle 10 in such a manner that a rotation axis (not shown) of the motor 11 is extended in the transverse direction of the vehicle 10 (i.e. so that the motor unit 13 is mounted in the vehicle 10 in the transverse layout manner), therefore, during acceleration of the vehicle 10, it is possible to generate counter momentum $M_C$ suppressing the roll-momentum $M_R$ of the motor unit 13.

Now, the demerits of having a motor-roll center below a motor unit will be described using FIG. 6.

In this case, a roll-momentum $M_{R1}$ is generated at a motor unit 13'. When a vehicle 10' runs forward, an inertia force $F_1$ is generated at a center of mass $G_1$ of the motor-unit 13'.

Accordingly, at the motor unit 13', an inertia momentum $M_I$ centered at a motor-roll center $R_1$ is generated. The inertia momentum $M_I$ is obtained by multiplying a distance $L_1$ from the motor-roll center $R_1$ and the center mass $G_1$, and the inertia force $F_1$ ($M_1 = L_1 \times F_1$).

Figure 6:
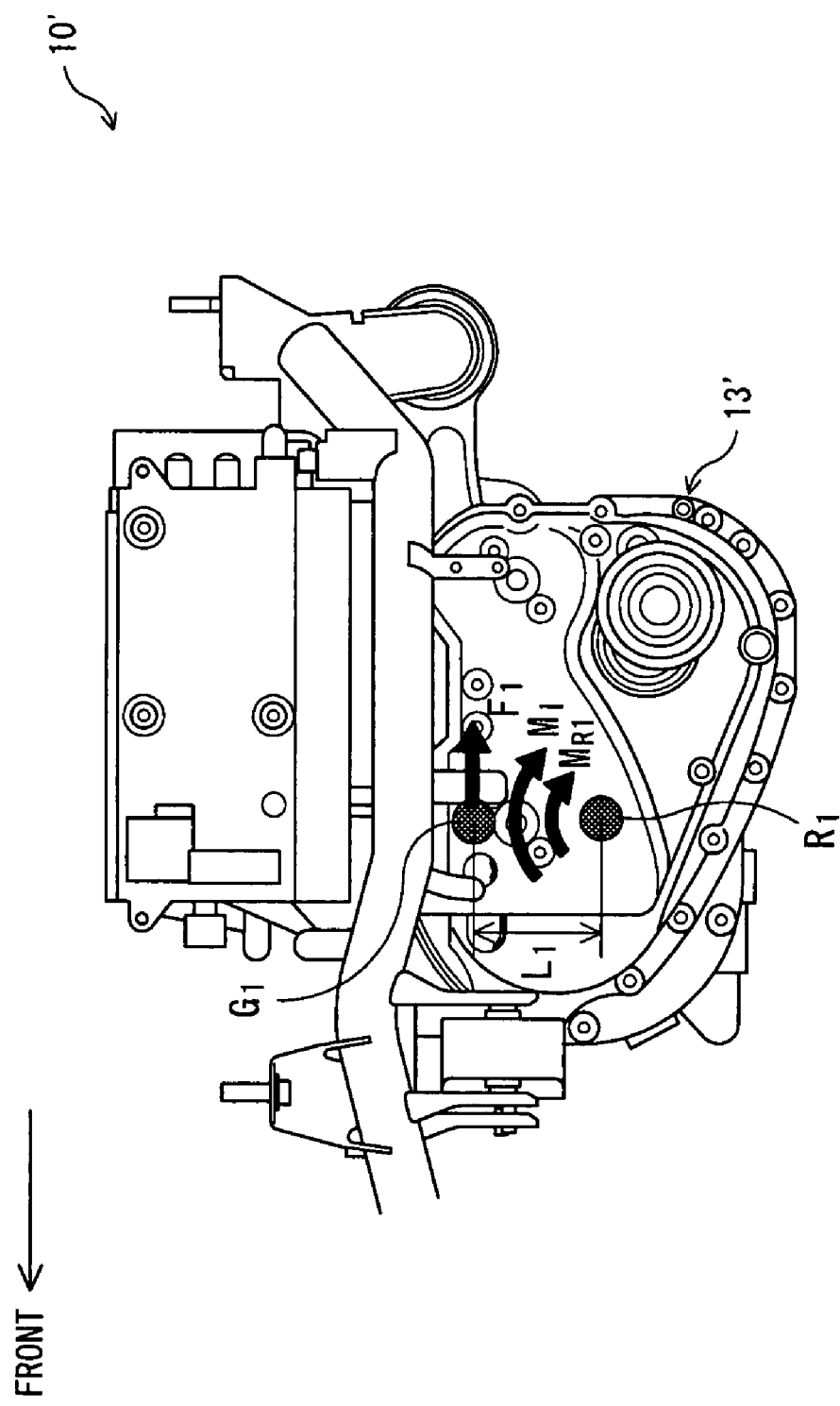
FIG. 6 is a schematic side view of a comparative example of an electric motor mounting structure of the embodiment of the present invention.

Namely, as shown in FIG. 6, assuming that the motor-roll center $R_1$ is located below the center of gravity $G_1$ of the motor-unit 13' and the vehicle 10' is accelerated, not only the roll-momentum $M_{R1}$ is generated, but also the inertia momentum $M_I$ at the motor-roll center $R_1$.

Whereas, as shown in FIG. 5, according to the present invention in this embodiment, the motor-roll center $R_0$ is located above the center of gravity $G_0$ of motor-unit 13. Accordingly, during acceleration of the vehicle 10, it is possible to suppress the roll-momentum $M_R$ of the motor unit 13 due to generating the counter momentum $M_C$ ($=L_2 \times F$) at the motor unit 13.

Further, the load applied to parts supporting the motor unit 13 is reduced, and therefore, it is possible to reduce costs and size of the parts.

The present invention is not limited to the above embodiment, but covers all changes and modifications which do not constitute departures from the spirit and scope of the invention.

In the above embodiment, the motor unit 13 is mounted only at the rear side of the vehicle 10 (i.e. Midship mounted power source—Rear drive (MR) vehicle or Rear mounted power source—Rear drive (RR) vehicle), however the embodiment is not limited to such a case. For example, the present invention can apply to a vehicle in which the motor unit is mounted at the front side (i.e. Front mounted power source—Front drive (FF) vehicle).

Alternatively, the present invention can also be applied to another vehicle, on which the motor units are mounted at the front and rear side, driven by four wheels (i.e. 4 Wheel Drive (4WD) vehicle).

Further, in the above embodiment, the power from the motor unit 13 is directly used for driving the vehicle 10, however it is not limited to this case. For example, the present invention can apply to a vehicle equipped with a motor unit for generating electricity.

From the invention thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. A structure for mounting an electric motor in a vehicle, comprising:
    a mounting frame detachably fixed to a body component of the vehicle by a bolt;
    a upward-projecting bracket, which is upwardly projected from said mounting frame, being attached to the body component of the vehicle;
    a bolt hole, in which the bolt is inserted, being formed on said upward-projecting bracket; and
    a downward-projecting bracket, which is downwardly projected from said mounting frame, being connected to the electric motor,
    both said mounting frame and said downward-projecting bracket being set apart from an axis of said bolt hole inward in the width direction of the vehicle, and
    said downward-projecting bracket is disposed in a position beneath said upwardly-projecting bracket in side view.

2. The mounting structure according to claim 1, further comprising:
    a cross member connecting both ends of the mounting frame, which is a U-shaped member, wherein
    a control unit, for managing the electric motor, is disposed on said cross member and is electrically connected with the electric motor.

3. The mounting structure according to claim 1, wherein said mounting frame is made by bending a pipe into a substantially U shape.

4. The mounting structure according to claim 1, wherein said upward-projecting bracket and said downward-projecting bracket are fixed adjacent to an end of the mounting frame.

5. The mounting structure according to claim 1 further comprising:
    a motor bracket being fixed to said electric motor; and
    a pair of vibration dampeners being equipped with both ends of said motor bracket, wherein
    a pair of said downward-projecting brackets, which are individually fixed adjacent to both ends of the mounting frame, supports said electric motor via the pair of said vibration dampeners.

6. The mounting structure according to claim 1, wherein said mounting frame and said downward-projecting bracket are set apart from the axis of said bolt hole by a distance just sufficient enough to insert said bolt into said bolt hole.

7. A structure for mounting an electric motor to a vehicle, the mounting structure comprising:
    means for fixing the electric motor to the vehicle; and
    means for defining a position of a motor-roll-center, which is an axis of roll-momentum of the electric motor when the electric motor works, to be in a transversal direction of the vehicle, wherein
    said motor-roll-center defining means sets the location of the motor-roll-center above a center of gravity of the electric motor.

8. The mounting structure according to claim 7, wherein said motor-roll-center defining means sets the location of the motor-roll-center directly over the center of gravity of the electric motor.

9. The mounting structure according to claim 7, wherein said electric motor fixing means and said motor-roll-center defining means which are integrated and which enable the electric motor to be equipped with the vehicle so that a rotation axis of the electric motor extends in the transversal direction of the vehicle.

10. The mounting structure according to claim 7, further comprising:
    a mounting frame fixed to a body component of the vehicle; and
    a downward-projecting bracket provided to said mounting frame,
    wherein said motor-roll-center defining means defines the position of the motor-roll-center by changing the position of said downward-projecting bracket at said mounting frame and characteristics of a rubber bush fixed to said downward-projecting bracket.

* * * * *